March 19, 1946.  J. VERNER  2,397,064

TRACTION WEIGHT AND FENCE GUARD

Filed Oct. 25, 1944

INVENTOR.

James Verner

BY *Victor J. Evans & Co.*

ATTORNEYS

Patented Mar. 19, 1946

2,397,064

UNITED STATES PATENT OFFICE 2,397,064

TRACTION WEIGHT AND FENCE GUARD

James Verner, Pocahontas, Iowa

Application October 25, 1944, Serial No. 560,318

2 Claims. (Cl. 280—150)

The invention relates to a tractor attachment and more particularly to a fence guard and weight attachment for a tractor.

The primary object of the invention is the provision of an attachment of this character, wherein a weight can be secured in place upon the power axle outside of its traction wheel, to effect in addition to the weight quality thereof, a fence guard, for preventing entanglement of the tractor therewith, when traveling close to such fence, and in this way eliminating damage to the latter.

Another object of the invention is the provision of an attachment of this character, wherein the same is in the form of a spherical element forming a weight which can be coupled to the driving axle of a tractor to effect a guard to prevent the tearing or breaking down of a wire or other fence, as the axle or wheel driven thereby cannot do damage thereto should contact be made with the same.

A further object of the invention is the provision of an attachment of this character, which is simple in construction, thoroughly reliable and efficient in its purposes, strong, durable, readily and easily applied and removed, assuring increase traction to the tractor when in service, and inexpensive to manufacture and install.

With these and other objects in view the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
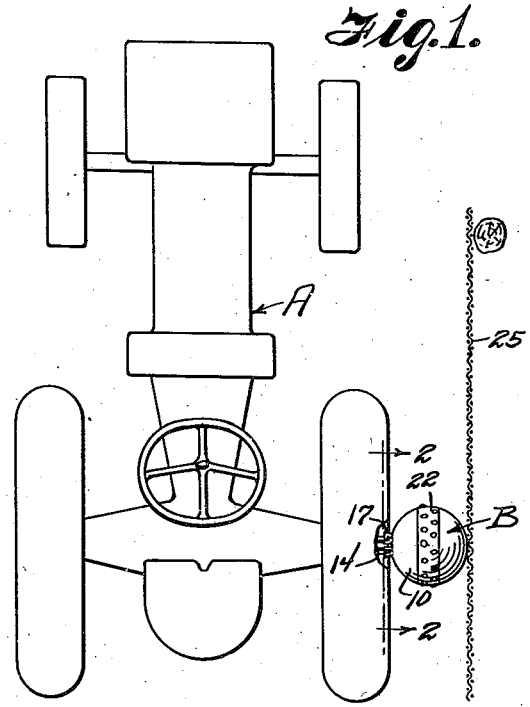
Figure 1 is a top plan view of a tractor showing the attachment constructed in accordance with the invention applied thereto and in contact with a fence adjacent to the tractor when in service.
Figure 2:
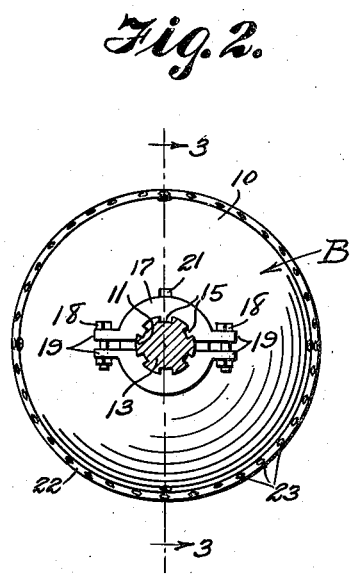
Figure 2 is a sectional view taken on the line 2—2 of Figure 1 looking in the direction of the arrows.

Referring to the drawing in detail A designates generally a tractor, which may be of any standard construction and now commonly used for draft purposes, and B denotes the attachment in its entirety constructed in accordance with the invention, and hereinafter set forth in detail.

The attachment B comprises a substantially spherical shaped body 10 which may be of any required size to give the desired weight for increasing the traction of the driving wheels of the tractor A when in use thereon. This body 10 has formed therein an axle socket 11, which at the entrance open end portion 12 is of inwardly tapered formation. Into this portion 12 is introduced the outer end 13 of the driving axle 14 of the tractor A. The end portion 13 of the axle 14 is provided with longitudinal spline-ways 15 for the engagement of spines or key ribs 16 interiorly of a two-part or split tapering wedging collar or locking bushing 17 which interlocks with the end 13 on encirclement thereof for wedge fitting within open entrance end portion 12 of the socket 11 in the body 10 to be securely fastened on the said axle 14 to serve as a traction wheel weight, and also for functioning as a fence guard to the tractor when in service.

The parts of the collar or bushing 17 are detachably fastened together by coupling bolts 18 which fit in ears 19 on such parts of the said collar or bushing.

The collar or bushing 17 is made fast in the end portion 12 of the socket 11 in the body 10 by a locking rib 20 engaging in a way 21 therefor.

Figure 3:
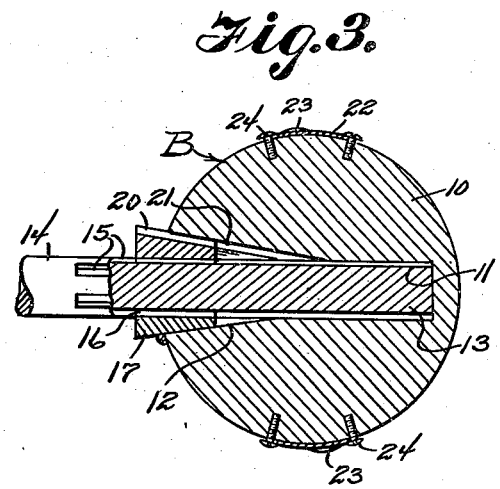
Figure 3 is a sectional view taken on the line 3—3 of Figure 2 looking in the direction of the arrows.
Figure 4:
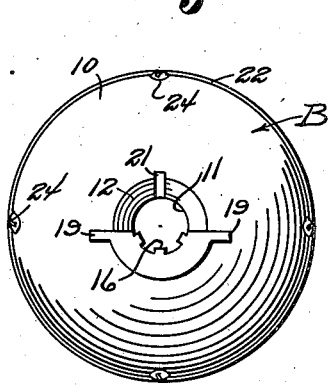
Figure 4 is an inside elevation of the attachment removed.

Surrounding the body 10 is a safety band 22 having red colored signal beads 23 which also may be in the form of buttons, so that the attachment can serve as a road signal when the tractor A is traveling thereon by day or night, the band 22 being secured in place by fasteners 24, as best seen in Figure 3 of the drawing, while in Figure 1 there is shown a fence 25 with which the body 10 is making contact and this body functioning as a guard for the fence.

What is claimed is:

1. An attachment of the kind described, comprising a substantially spherical shaped body having an axle socket therein the outer open end of which is of a slightly larger dimension than the socket and the walls of the socket are inwardly tapered, means coacting with the inwardly tapered walls of the socket for wedging the body on an axle when in the socket in the latter, and means for fastening the last named means in place.

2. An attachment of the kind described, comprising a substantially spherical shaped body having an axle socket therein the outer walls of which are inwardly tapered, a split collar coacting with said tapered walls for wedging the body on an axle when in the socket in the latter, bolts for fastening the split collar in place and a signalling means externally about the body.

JAMES VERNER.